(12) United States Patent
Yao et al.

(10) Patent No.: US 11,302,028 B2
(45) Date of Patent: Apr. 12, 2022

(54) VARIATIONAL 3D OBJECT DETECTION

(71) Applicant: TOYOTA RESEARCH INSTITUTE, INC., Los Altos, CA (US)

(72) Inventors: Yu Yao, Ann Arbor, MA (US); Wadim Kehl, Mountain View, CA (US); Adrien Gaidon, San Jose, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 287 days.

(21) Appl. No.: 16/752,252

(22) Filed: Jan. 24, 2020

(65) Prior Publication Data

US 2021/0134002 A1 May 6, 2021

Related U.S. Application Data

(60) Provisional application No. 62/928,193, filed on Oct. 30, 2019.

(51) Int. Cl.
*G06T 7/73* (2017.01)
*H04N 13/211* (2018.01)
*G01C 21/20* (2006.01)
*G06K 9/00* (2022.01)

(52) U.S. Cl.
CPC .............. *G06T 7/73* (2017.01); *G01C 21/20* (2013.01); *G06K 9/00805* (2013.01); *H04N 13/211* (2018.05)

(58) Field of Classification Search
CPC ............ G06T 2207/30244; G06T 7/73; G06T 2207/30261; G06K 9/3241
See application file for complete search history.

(56) References Cited

U.S. PATENT DOCUMENTS

2019/0258878 A1 8/2019 Koivisto et al.
2020/0302667 A1* 9/2020 del Val Santos ....... G06N 3/088

OTHER PUBLICATIONS

Zia, et al., "Towards Scene Understanding with Detailed 3D Object Representations", Int'l Journal of Computer Vision, arxiv.org, Nov. 18, 2014, pp. 1-15.
Bertoni, et al., "MonoLoco: Monocular 3D Pedestrian Localization and Uncertainty Estimation", arxiv.org, Aug. 20, 2019, pp. 1-11.
Jorgensen, et al., "Monocular 3D Object Detection and Box Fitting Trained End-to-End Using Intersection-Over-Union Loss", arXiv.org, Jun. 20, 2019, pp. 1-10.
Ankit Dhall, "Real-Time 3D Pose Estimation with a Monocular Camera Using Deep Learning and Object Priors on an Autonomous Racecar", Swiss Federal Institute of Technology (Thesis), Sep. 28, 2019, pp. 1-59, Zurich, Switzerland.

* cited by examiner

*Primary Examiner* — Sam Bhattacharya
(74) *Attorney, Agent, or Firm* — Seyfarth Shaw LLP (57) ABSTRACT

A method for monocular 3D object perception is described. The method includes sampling multiple, stochastic latent variables from a learned latent feature distribution of an RGB image for a 2D object detected in the RGB image. The method also includes lifting a 3D proposal for each stochastic latent variable sampled for the detected 2D object. The method further includes selecting a 3D proposal for the detected 2D object using a proposal selection algorithm to reduce 3D proposal lifting overlap. The method also includes planning a trajectory of an ego vehicle according to a 3D location and pose of the 2D object according to the selected 3D proposal.

20 Claims, 7 Drawing Sheets

VARIATIONAL 3D OBJECT DETECTION

CROSS-REFERENCE TO RELATED APPLICATION

This application claims the benefit of U.S. Provisional Patent Application No. 62/928,193, filed on Oct. 30, 2019, and titled "VARIATIONAL 3D OBJECT DETECTION," the disclosures of which are expressly incorporated by reference herein in their entireties.

BACKGROUND

Field

Certain aspects of the present disclosure generally relate to machine learning and, more particularly, a system and method for variational 3D object detection.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

In operation, autonomous agents may rely on a trained convolutional neural network (CNN) to identify objects within areas of interest in an image of a surrounding scene of the autonomous agent. For example, a CNN may be trained to identify and track objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as an autonomous vehicle. Object detection applications for autonomous vehicles may analyze sensor image data for detecting objects in the surrounding scene from the autonomous agent.

Autonomous agents, such as driverless cars and robots, are quickly evolving and have become a reality in this decade. Unfortunately, because autonomous vehicles have to interact with other non-autonomous vehicles, many critical concerns arise. In particular, visual object localization and 3D pose estimation are important perception tasks in the areas of robotics and autonomous driving. Conventional 3D object detection approaches adopt features from 2D detection models and estimate their corresponding 3D boxes using a one-to-one mapping. Unfortunately, detecting 3D poses or bounding boxes from monocular RGB images is problematic because objects located in the same frustum exhibit similar 2D projections on an image plane. That is, monocular (e.g., single-camera) 3D object detection is limited by a lack of 3D information. Moreover, occlusions in a 3D scene result in overlaps in the 2D projections and, therefore, the image features are generally similar.

SUMMARY

A method for monocular 3D object perception is described. The method includes sampling multiple, stochastic latent variables from a learned latent feature distribution of an RGB image for a 2D object detected in the RGB image. The method also includes lifting a 3D proposal for each stochastic latent variable sampled for the detected 2D object. The method further includes selecting a 3D proposal for the detected 2D object using a proposal selection algorithm to reduce 3D proposal lifting overlap. The method also includes planning a trajectory of an ego vehicle according to a 3D location and pose of the 2D object according to the selected 3D proposal.

A non-transitory computer-readable medium having program code recorded thereon for monocular 3D object perception is described, in which the program code is executed by a processor. The non-transitory computer-readable medium includes program code to sample multiple, stochastic latent variables from a learned latent feature distribution of an RGB image for a 2D object detected in the RGB image. The non-transitory computer-readable medium also includes program code to lift a 3D proposal for each stochastic latent variable sampled for the detected 2D object. The non-transitory computer-readable medium further includes program code to select a 3D proposal for the detected 2D object using a proposal selection algorithm to reduce 3D proposal lifting overlap. The non-transitory computer-readable medium also includes program code to plan a trajectory of an ego vehicle according to a 3D location and pose of the 2D object according to the selected 3D proposal.

A system for variational 3D object detection is described. The system includes a stochastic feature module configured to sample multiple, stochastic latent variables from a learned latent feature distribution of an RGB image for a 2D object detected in the RGB image. The system also includes a variational 3D lifting module configured to lift a 3D proposal for each stochastic latent variable sampled for the detected 2D object. The system further includes a 3D perception module configured to select a 3D proposal for the detected 2D object using a proposal selection algorithm to reduce 3D proposal lifting overlap. The system further includes a planner module configured to plan a trajectory of an ego vehicle according to a 3D location and pose of the 2D object according to the selected 3D proposal.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Visual object localization and 3D pose estimation are important perception tasks in the areas of robotics and autonomous driving. Conventional 3D object detection approaches adopt features from 2D detection models and estimate their corresponding 3D bounding boxes using a one-to-one mapping. Unfortunately, detecting 3D poses/3D bounding boxes from monocular RGB 2D images is problematic because objects located in the same frustum exhibit similar 2D projections on an image plane. That is, monocular (e.g., single-camera) 3D object detection is limited by a lack of 3D (e.g., depth) information in an RGB image. Moreover, occlusions in a 3D scene result in overlaps in the 2D projections and, therefore, the image features are generally similar, which complicates monocular 3D object detection.

Aspects of the present disclosure are directed to a vehicle system configured to perform variational 3D object detection. This aspect of the present disclosure proposes a novel method for handling overlapping detections in 3D space by enforcing physical overlap constraints. For example, ambiguity in 2D to 3D projection is modeled as the uncertainty of a stochastic latent variable sampled from a learned latent feature distribution of a 2D RGB image, resulting in one 2D object detection to many 3D object prediction proposals. Then a confidence network is trained to estimate the confidence scores of multiple 3D object prediction proposals (e.g, a detected 3D object is 10 feet away vs. 20 feet away from an ego vehicle). In this aspect of the present disclosure, the best 3D object prediction proposals are selected using an optimization based approach combined with a physical overlap constraint between the 3D object prediction proposals.

According to aspects of the present disclosure, the vehicle system is directed to a method for addressing the ambiguity between a 2D projection and an actual 3D location and pose of an object in a video input received from a monocular camera. In one aspect of the present disclosure, the vehicle system models ambiguity as an unknown stochastic latent variable using a probabilistic generative model (e.g., a conditional variational 3D Detection (CV3D)).

One aspect of the present disclosure enables vehicle systems to model ambiguity by generating stochastic features (e.g., 2D proposals) using a deep convolutional neural network (CNN) backbone. The modeling may include sampling multiple latent variables and lifting multiple 3D proposals (e.g., each proposal is represented as a 3D box bound to a detected object) for each 2D proposal. This modeling also includes selecting one 3D proposal for each detected object using a proposal selection algorithm for reducing 3D proposal lifting overlaps. The process includes estimating a confidence score for each of the selected 3D proposals based on a corresponding visual feature, 2D projection, and relation to the other 3D proposals using a confidence network. The process further includes presenting the 3D proposals with the highest confidence scores as the final detected output of the vehicle system.

Figure 1:
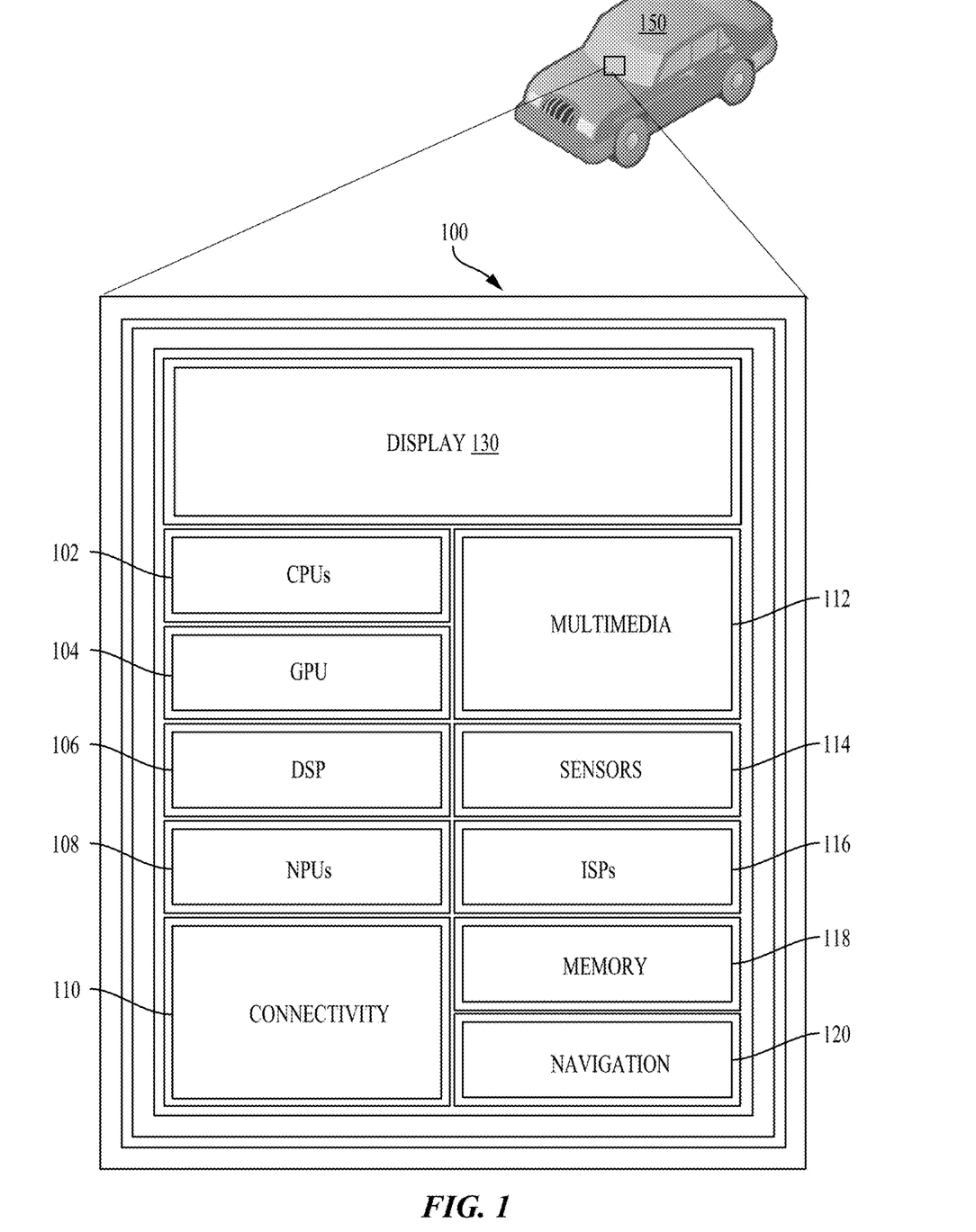
FIG. 1 illustrates an example implementation of designing a system using a system-on-a-chip (SOC) for monocular 3D object detection, in accordance with aspects of the present disclosure.

FIG. 1 illustrates an example implementation of the aforementioned system and method for monocular 3D object detection using a system-on-a-chip (SOC) 100 of an ego vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for monocular 3D object detection in an image captured by the sensor processor 114. The instructions loaded into a processor (e.g., CPU 102) may also include code for planning and control (e.g., intention prediction of the ego vehicle) in response to detecting a cyclist near the ego vehicle based on an image captured by the sensor processor 114.

Figure 2:
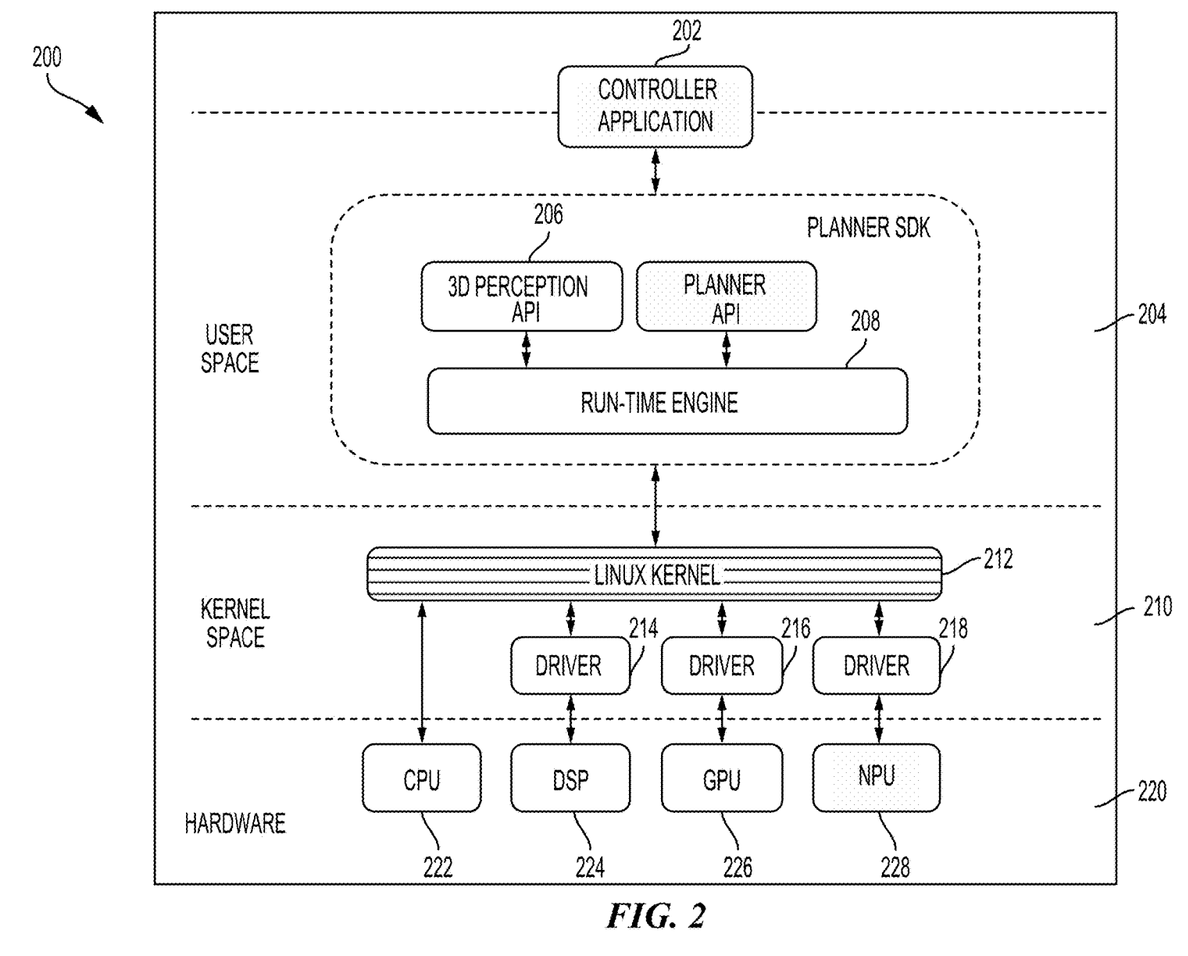
FIG. 2 is a block diagram illustrating a software architecture that may modularize functions for monocular 3D object detection, according to aspects of the present disclosure.

FIG. 2 is a block diagram illustrating a software architecture 200 that may modularize functions for planning and control of an ego vehicle for monocular 3D object detection, according to aspects of the present disclosure. Using the architecture, a controller application 202 may be designed such that it may cause various processing blocks of an SOC 220 (for example a CPU 222, a DSP 224, a GPU 226, and/or an NPU 228) to perform supporting computations during run-time operation of the controller application 202.

The controller application 202 may be configured to call functions defined in a user space 204 that may, for example, provide for variational 3D object detection from video captured by a monocular camera of an ego vehicle. The controller application 202 may make a request to compile program code associated with a library defined in a 3D object detect application programming interface (API) 206 to detect a 3D object from video captured by a monocular camera of an ego vehicle and control the ego vehicle based on a final output of the monocular 3D object detection.

A run-time engine 208, which may be compiled code of a runtime framework, may be further accessible to the controller application 202. The controller application 202 may cause the run-time engine 208, for example, to perform monocular (single-camera) 3D detection. When an object is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
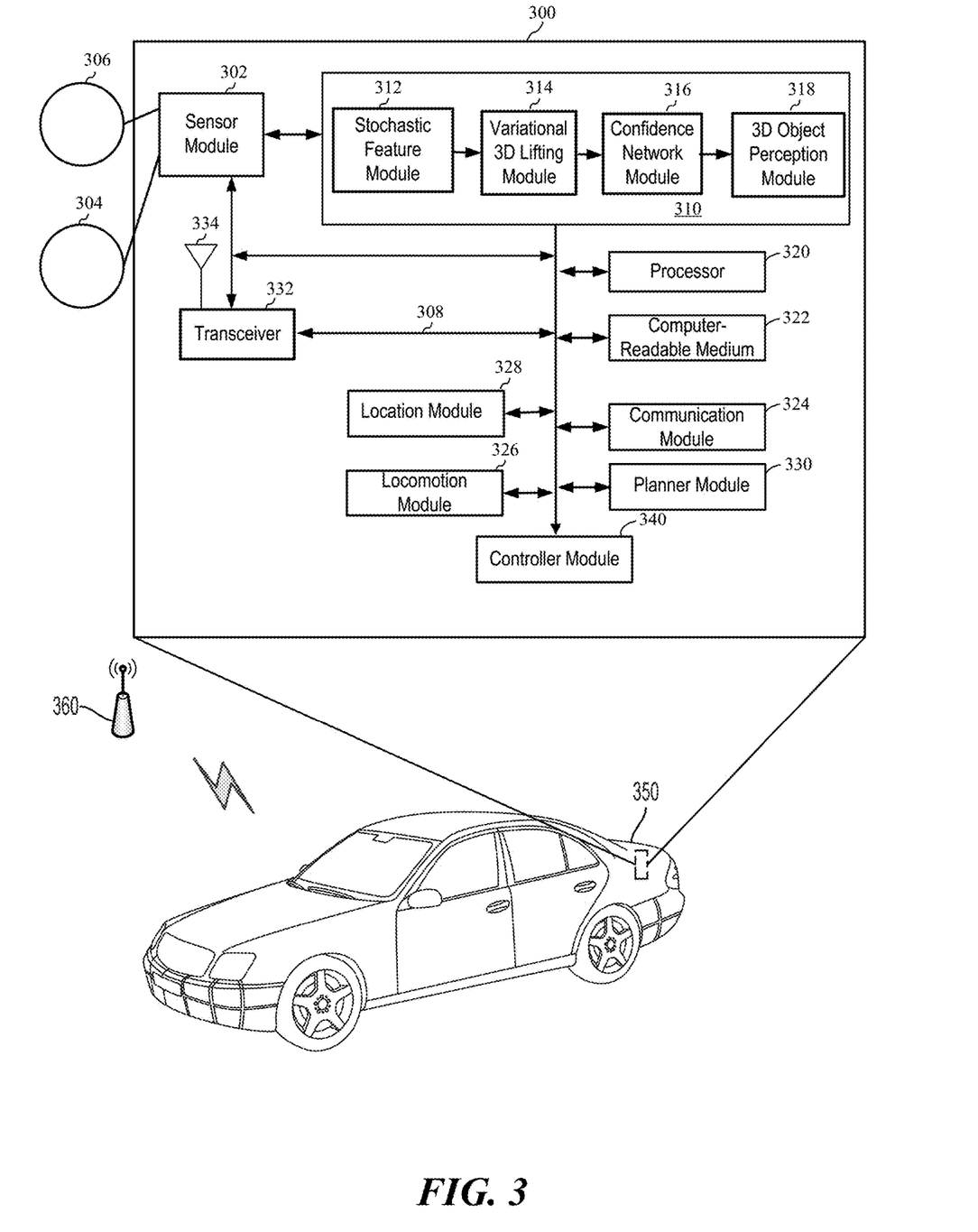
FIG. 3 is a diagram illustrating an example of a hardware implementation for a monocular 3D object detection system, according to aspects of the present disclosure.

FIG. 3 is a diagram illustrating an example of a hardware implementation for a monocular 3D object detection system 300, according to aspects of the present disclosure. The monocular 3D object detection system 300 may be configured for planning and control of an ego vehicle in response to monocular (single-camera) 3D object detection during operation of a car 350. The monocular 3D object detection system 300 may be a component of a vehicle, a robotic device, or other device. For example, as shown in FIG. 3, the monocular 3D object detection system 300 is a component of the car 350. Aspects of the present disclosure are not limited to the monocular 3D object detection system 300 being a component of the car 350, as other devices, such as a bus, motorcycle, or other like vehicle, are also contemplated for using the variational 3D object detection system 300. The car 350 may be autonomous or semi-autonomous.

The monocular 3D object detection system 300 may be implemented with an interconnected architecture, represented generally by an interconnect 308. The interconnect 308 may include any number of point-to-point interconnects, buses, and/or bridges depending on the specific application of the monocular 3D object detection system 300 and the overall design constraints of the car 350. The interconnect 308 links together various circuits including one or more processors and/or hardware modules, represented by a sensor module 302, an ego perception module 310, a processor 320, a computer-readable medium 322, communication module 324, a locomotion module 326, a location module 328, a planner module 330, and a controller module 340. The interconnect 308 may also link various other circuits such as timing sources, peripherals, voltage regulators, and power management circuits, which are well known in the art, and therefore, will not be described any further.

The monocular 3D object detection system 300 includes a transceiver 332 coupled to the sensor module 302, the ego perception module 310, the processor 320, the computer-readable medium 322, the communication module 324, the locomotion module 326, the location module 328, a planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit detected 3D objects and/or planned actions from the ego perception module 310 to a server (not shown).

The monocular 3D object detection system 300 includes the processor 320 coupled to the computer-readable medium 322. The processor 320 performs processing, including the execution of software stored on the computer-readable medium 322 to provide functionality, according to the present disclosure. The software, when executed by the processor 320, causes the monocular 3D object detection system 300 to perform the various functions described for ego vehicle perception based on monocular 3D object detection from video captured by a single camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing 2D RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the ego perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, detected 3D object information captured by the first sensor 304 and/or the second sensor 306 may be transmitted via the transceiver 332. The first sensor 304 and the second sensor 306 may be coupled to the car 350 or may be in communication with the car 350.

Visual object localization and 3D pose estimation are important perception tasks in the area of autonomous driving, such as the car 350. Conventional 3D object detection approaches adopt features from 2D detection models and estimate their corresponding 3D bounding boxes using a one-to-one mapping. Unfortunately, detecting 3D poses or bounding boxes from monocular RGB images such as those captured with the first sensor 304 and/or the second sensor 306 of the car 350 is problematic. Detecting 3D poses/bounding boxes from monocular RGB images is problematic because objects located in the same frustum exhibit similar 2D projections on an image plane. That is, monocular (e.g., single-camera) 3D object detection is limited by a lack of 3D (e.g., depth) information. Moreover, occlusions in a 3D scene result in overlaps in the 2D projections and, therefore, the image features are generally similar and, therefore, difficult to distinguish.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A DSRC-compliant GPS unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the car 350 parking space. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, long term evolution (LTE), 3G, etc. The communication module 324 may also communicate with other components of the car 350 that are not modules of the monocular 3D object detection system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MIMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The monocular 3D object detection system 300 also includes the planner module 330 for planning a selected route/action (e.g., collision avoidance) of the car 350 and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The ego perception module 310 may be in communication with the sensor module 302, the processor 320, the computer-readable medium 322, the communication module 324, the locomotion module 326, the location module 328, the planner module 330, the transceiver 332, and the controller module 340. In one configuration, the ego perception module 310 receives sensor data from the sensor module 302. The sensor module 302 may receive the sensor data from the first sensor 304 and the second sensor 306. According to aspects of the present disclosure, the ego perception module 310 may receive sensor data directly from the first sensor 304 or the second sensor 306 to perform monocular 3D object detection from images captured by the first sensor 304 or the second sensor 306 of the car 350.

As shown in FIG. 3, the ego perception module 310 includes a stochastic feature module 312, a variational 3D lifting module 314, a confidence network module 316, and a 3D object perception module 318 (e.g., 3D pose/location). The stochastic feature module 312, the variational 3D lifting module 314, the confidence network module 316, and the 3D object perception module 318 may be components of a same or different artificial neural network, such as a deep convolutional neural network (CNN) backbone. The ego perception module 310 is not limited to a deep CNN backbone. The ego perception module 310 receives a data stream from the first sensor 304 and/or the second sensor 306. The data stream may include a 2D RGB image from the first sensor 304 and LIDAR data points from the second sensor 306. The data stream may include multiple frames, such as image frames. In this configuration, the first sensor 304 captures monocular (single camera) 2D RGB images.

The ego perception module 310 is configured to perform visual object localization and 3D pose estimation from monocular RGB images received from the first sensor 304 or the second sensor 306 for autonomous operation of the car 350. According to aspects of the present disclosure, the ego perception module 310 is configured according to a probabilistic generative model, referred to herein as conditional variational 3D detection (CV3D). The CV3D module of the ego perception module 310 is configured to resolve the ambiguity between 2D projection and the actual 3D location and pose of a detected 3D object from a monocular RGB image.

In this aspect of the present disclosure, the stochastic feature module 312 models the ambiguity between 2D projection and the actual 3D location and pose as the uncertainty of an unknown stochastic latent variable. For each 2D proposal, the variational 3D lifting module 314 is configured to sample multiple latent feature variables and lift multiple 3D proposals from there. Such a one-to-many model of the variational 3D lifting module 314 compensates for the problem of different 3D objects that have similar 2D features. A confidence network of the confidence network module 316 is then applied to estimate a confidence score for each 3D proposal based on its visual feature, its 2D projection, and its relation to the other 3D proposals.

To select the best 3D proposals, a multi-objective problem is formulated to increase a total confidence score while reducing the total intersection over unions (IOUs) between 3D bounding box pairs. In addition, IOUs between 3D bounding box pairs may be referred to herein as "a physical collision" or "a physical overlap constraint." Instead of simply trusting the high-confidence proposals, the 3D object perception module 318 is configured to select less-confidence proposals to realize less physical collision. In this configuration, the ego perception module 310 implements a variational 3D object detection algorithm which ensures multimodal 3D prediction. In addition, the confidence network module 316 is configured to consider 3D-2D matches, deep features, as well as social relations between lifts from the variational 3D lifting module 314. The 3D object perception module 318 performs a multi-objective optimization based lifting proposal selection algorithm to calculate the best lifts among variational predictions of a location and pose of a detected 3D object. The features of the ego perception module 310 are further illustrated in FIG. 4.

Figure 4:
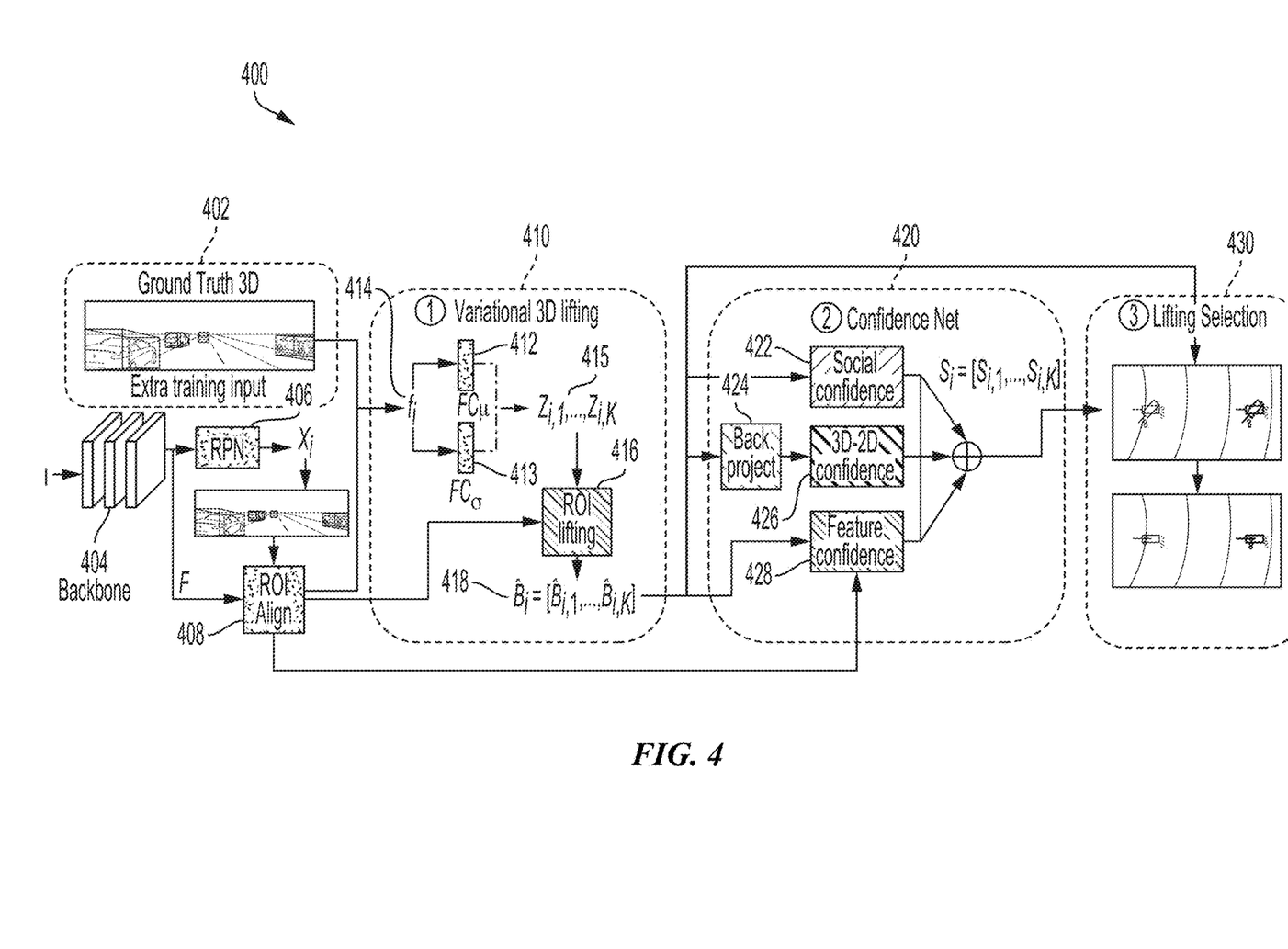
FIG. 4 is a diagram illustrating a pipeline of a variational 3D lifting module for monocular 3D object detection from red-blue-green (RGB) 2D images, according to aspects of the present disclosure.

FIG. 4 is a diagram illustrating a variational 3D lifting pipeline 400 for monocular 3D object detection from 2D RGB images, according to aspects of the present disclosure. In one aspect of the present disclosure, the variational 3D lifting pipeline 400 is used to implement the ego perception module 310 shown in FIG. 3. In this aspect of the present disclosure, a preprocessing stage generates stochastic features F using a 2D detection backbone 404 (e.g., deep CNN), which are provided to a region proposal network (RPN) block 406 and a region of interest (ROI) align block 408. In this configuration, the RPN block 406 computes a 2D bounding box $X_i$ of a detected object i. The 2D bounding box $X_i$ is provided to an ROI align block 408, which is configured to generate an observed feature f of the detected object i (e.g., fi 414).

Next, a variational 3D lifting block 410 samples K latent variables 415 (e.g., $Z_{i,1} \ldots Z_{i,K}$) for the detected object i in response to ground truth 3D 402 and the fi 414. In this configuration, variational 3D lifting block 410 includes a first neural network 412 ($FC_\mu$) and a second neural network 413 ($FC_\sigma$), which are trained to sample the K latent variables 415. In this example, an ROI lifting block 416 lifts one 3D box from each latent variable (e.g, $Z_{i,k}$) of the K latent variables 415 to form K 3D bounding boxes 418, which may be referred to as 3D bounding box proposals of the detected object i.

In this configuration, a confidence network 420 is applied to compute a confidence value for each of the K 3D bounding boxes 418. In this configuration, the confidence network 420 includes a social confidence network 422, a back project block 424, a 3D-2D confidence network 426, and a feature confidence network 428. In this example, the K 3D bounding boxes 418 are ranked based on a collective confidence score ($s_i$) from the social confidence network 422, the 3D-2D confidence network 426, and the feature confidence network 428. Based on the confidence score $s_i$, a lifting selection block 430 is configured to select the best 3D bounding box proposal as the final 3D bounding box output (e.g., a location and 3D pose of the detected object i, as described in further detail below.

1. 3D Object Modeling Preliminary

One aspect of the present disclosure models the proposed 3D bounding boxes 418 of each detected 2D object i. Modeling of the proposed 3D bounding boxes 418 is performed using a projected 3D center c=[x, y], a depth to the image plane z, an orientation represented as a quaternion $Q=[q_0, q_1, q_2, q_3]$, and scales e=[w, h, l], resulting in a 10-dimensional vector $B=[c, z, Q, e] \in \mathbb{R}^{10}$ to provide an orientation in global coordinates, which may be regressed. Regressing the orientation in global coordinates, however, can be ambiguous because the viewpoint and object can be changed by change in translation even though its global orientation may stay the same. Therefore, aspects of the present disclosure regress the allocentric orientation of the object and transform it to an egocentric coordinate based on the regressed translation.

For example, the alignment between a predicted 3D bounding box and the targets is calculated as the 3D regression loss. To be specific, the eight corners $\mathcal{B} \in \mathbb{R}^{8 \times 3}$ are computed from the 10-dimensional vector $\mathcal{B}$. Once computed, the average alignment $\frac{1}{8}\|\mathcal{B}-\hat{\mathcal{B}}\|_2$ is used as the 3D regression loss.

2. Conditional Variational 3D Lifting 2.1 2D Object Detection

In aspects of the present disclosure, a monocular 3D detection model of the variational 3D lifting pipeline 400 contains the 2D detection backbone 404 and both 2D and 3D detection modules (e.g., the first neural network 412 and the second neural network 413) of the variational 3D lifting block 410 are trained simultaneously.

This aspect of the present disclosure applies a fully convolutional one stage (FCOS) object detector. For example, the FCOS object detector is implemented using a ResNet50 backbone (e.g., the 2D detection backbone 404) followed by a feature pyramid network (FPN) structure, including the RPN block 406 and the ROI align block 408.

Instead of constructing a large amount of anchor boxes using a region proposal network (RPN), according to aspects of the present disclosure, FCOS object detector regresses one bounding box at each pixel location with a centerness score and a class score, resulting in a more efficient 3D detection model.

For example, the 2D detection loss is a summation of bounding box regression loss, classification loss, and centerness loss:

$$L_{2D}=L_{reg}+L_{cls}+L_{cen} \qquad (1)$$

where $L_{reg}$ is the log of the intersection over union (IoU) between regressed and target boxes, $L_{cls}$ is computed from focal loss, and $L_{cen}$ is a binary cross-entropy loss.

To obtain the feature used for 3D detection, one aspect of the present disclosure uses 5-level FPN feature maps $F=[F_1, \ldots, F_5]$ and a proposed 2D bounding box $X_i=[x_i, y_i, w_i, h_i]$ (e.g., region of interest, ROI, or the observed feature f of the detected object i (fi 414)). In this configuration, the ROI align block 408 is configured to extract (crop) ROI features (e.g., f 414) from a selected FPN level j, as presented in Eq. (2).

$$j = \min\left(5, \max\left(1, \left[2 + \log_2\left(\frac{\sqrt{w_i h_i}}{224}\right)\right]\right)\right) \qquad (2)$$

$$f_i = ROI \; \text{Align}(X_i, F_j) \qquad (3)$$

Although conventional monocular 3D detection approaches may regress 3D parameters from the ROIAlign features (see Eq. (3)), such a feature cannot solve the ill-posed problem in 2D to 3D lifting, especially when objects are close together in an image plane. For example, the differences between ROIAlign features (see Eq. (3)) may concentrate on a low value when the intersection over union (IoU) between ROI pairs are large. Moreover, even for non-overlapped objects, their features can be close as well, showing that the features are designed to be 3D-invariant by the classification problem.

2.2 Conditional Variational Lifting

The uncertainty of the 3D bounding box B (e.g., K 3D bounding boxes 418) given an observed 2D detection feature f (e.g., fi 414) is modeled by $p_\theta(B|f)$, so that the objective is to maximize the log-likelihood:

$$\max_\theta \log p_\theta(B|f). \qquad (4)$$

2.2.1 Conditional Generative Model for 3D Lifting

The parameter of the conditional generative model in Eq. (4), however, cannot be directly estimated because the distribution function is unknown. According to aspects of the present disclosure, the monocular 3D detection (e.g., conditional variational 3D Detection (CV3D)) models this uncertainty as a stochastic latent variable Z (e.g., the K latent variables 415) with a known distribution function (e.g., a Gaussian distribution $N/(\mu z, \sigma z)$ in latent space. In order to model this Z, as a learnable variable, we take advantage of the conditional generative model (CGM), also known as conditional variational auto-encoder (CVAE), resulting in a variational lifting module as presented in FIG. 5.

Figure 5:
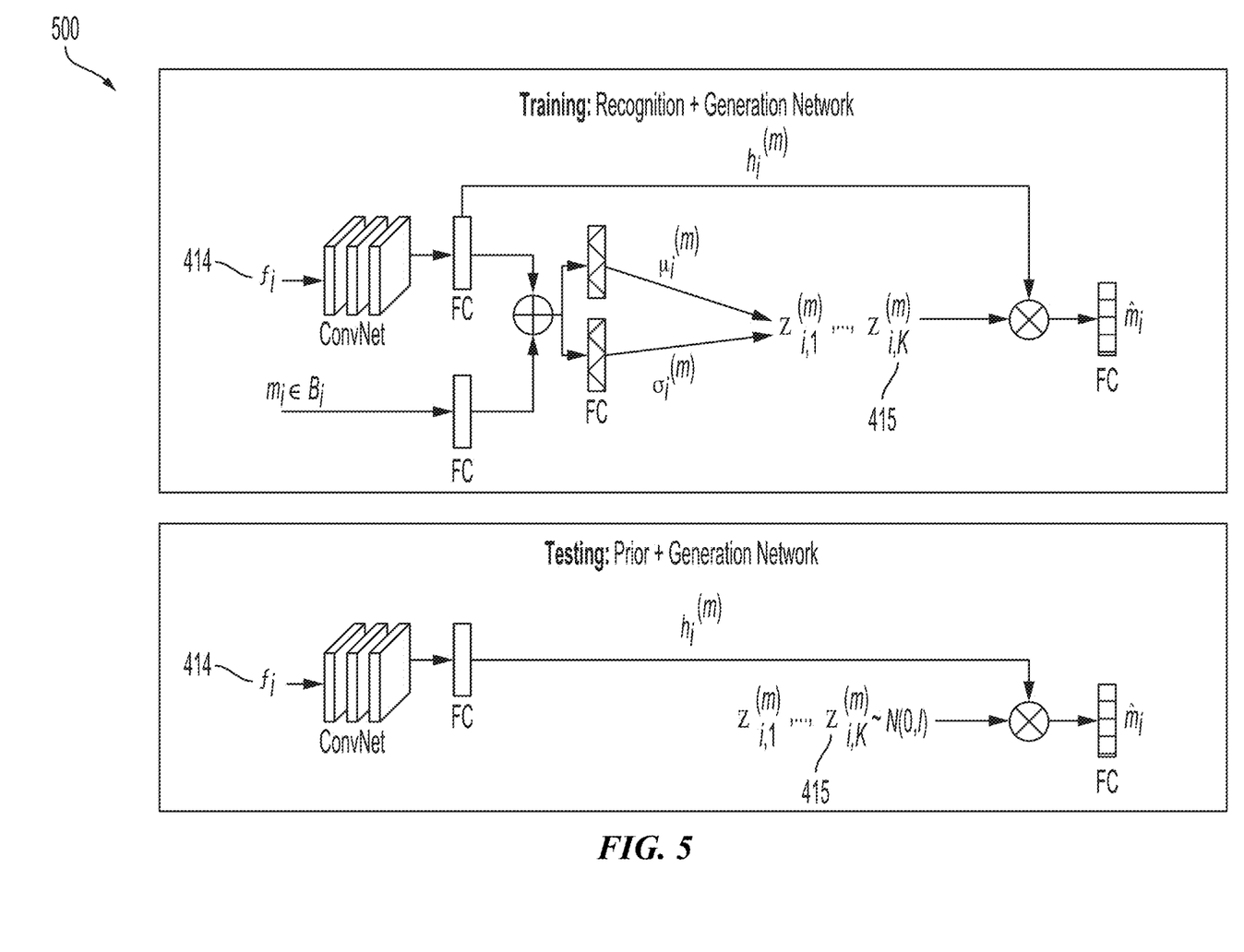
FIG. 5 illustrates training and testing of a variational lifting module, according to aspects of the present disclosure.

FIG. 5 illustrates training and testing of a variational 3D lifting module 500, according to aspects of the present disclosure. In aspects of the present disclosure, the variational 3D lifting module 500 may be configured according to the variational 3D lifting block 410, as shown in FIG. 4. According to further aspects of the present disclosure, the conditional variational auto-encoder or CVAE is solved by using a stochastic gradient variational Bayes (SGVB) framework, so that the objective in Eq. (4) can be rewritten as maximizing the variational lower bound:

$$\max_{\theta,\phi} -KL(q_\phi(Z|f, B) \| p_\theta(Z|f)) + \mathbb{E}_{q_\phi(Z|f,B)}[\log p_\theta(B|f, Z)], \quad (5)$$

where KL(•) calculates the KullbackLeibler (KL) divergence between the posterior and the prior distribution of Z to close the gap between the distribution observed during training and the distribution sampled during testing. The second term in Eq. (5) is a generative model performance metric; namely, the accuracy of the 3D lifting.

In this configuration, the variational 3D lifting module 500 contains three sub-modules: a conditional prior network $p_\theta(Z|f)$, a recognition network $q_\phi(Z|f, B)$, and a generation network $p_\theta(\hat{B}|f, Z)$, where $\phi$ and $\theta$ represent network parameters, the $\wedge$ sign indicates predicted values.

In conditional generative model or CGM, the posterior distribution of latent variable Z is modulated based on the recognition network $q_\phi(Z|f, B)$. This means that given the observed feature f pooled from 2D detection and its corresponding ground truth 3D bounding box B, the uncertainty can be estimated and the latent variable Z can be sampled (e.g., the K latent variables 415). The generative model $p_\theta(\hat{B}|f, Z)$ estimates the 3D bounding box $\hat{B}$ from observed f (e.g., fi 414) and sampled Z (e.g., the K latent variables 415). Different from a variational auto-encoder (VAE) based method, which predicts from stochastic latent variables, the CGM method of the present disclosure conditions the output on the observation as well, which helps guide the prediction. The prior distribution of latent variable Z without observing the 3D bounding box is modulated by the observed feature f through the prior network $p_\theta(Z|f)$, which can be relaxed by assuming independence between Z and f (e.g., $p_\theta(Z|f)=p_\theta(Z)$). In aspects of the present disclosure, a Gaussian distribution is assumed for the latent variable Z, so that $Z\sim N(\mu z, \sigma z)$. Similar to CGM, the stochastic latent variable Z allows the variational 3D lifting module 500 to estimate a diverse set of proposed 3D bounding boxes 418, given the observed feature of the object i (e.g., fi 414).

2.2.2 Joint Modeling of 3D Components

In aspects of the present disclosure, the CV3D model has independent networks to estimate 3D components [c, z, Q, e] because their geometric and physical characteristics are different and the difficulties in regressing these components are different.

Conditionally Independent Components: Aspects of the present disclosure assume each of the 3D components are conditionally independent given the 2D feature. As a result, different latent variables are sampled to model the uncertainty in components. To be specific, we have $Z=\{Z^{(Q)}, Z^{(z)}\}$ for the quaternion latent and depth latent variables. Aspects of the present disclosure recognize that the centroids c and scales e of objects are more deterministic so that deterministic networks are used to regress these two components. Therefore, the likelihood $p_\theta(B|f)$ can be written as:

$$\underbrace{\frac{p(z|f, Z^{(z)})p(Z^{(z)}|f)}{P(Z^{(z)}|z, f)}}_{\text{Depth model}} \underbrace{\frac{p(Q|f, Z^{(Q)})p(Z^{(Q)}|f)}{P(Z^{(Q)}|Q, f)}}_{\text{Quaternion model}} \quad (6)$$

Taking a quaternion model as an example, during training, the observed feature f of the detected object i (e.g., fi 414) is first encoded by a stack of convolutional neural networks (CNN) followed by a fully-connected (FC) layer, resulting in feature vector $h_i^{(Q)}$. The ground truth quaternion Q, is encoded by another FC layer and then concatenated with $h_i^{(Q)}$ resulting in a paired feature. Such a feature vector is then passed through two parallel FC layers to produce the mean $\mu_{Zi}^{(Q)}$ and standard deviation $\sigma_{Zi}^{(Q)}$. Then, a differentiable reparameterization technique is applied to sample the latent variable: $Z_{i,k}^{(Q)} = \mu_{Zi}^{(Q)} + \sigma_{Zi}^{(Q)} \odot \epsilon_k$, $\epsilon_k \sim N(0,I)$, where $\odot$ indicates an element-wise product. Although there are many ways to combine the latent variable with the observed feature, this aspect of the present disclosure treats this stochastic process as a "guided drop out" of Eq. (7).

$$\hat{Q}_{i,k} = \psi_2^{(Q)}(f_i \odot \text{Softmax}(\psi_1^{(Q)}(Z_{i,k}^{(Q)}))), \quad (7)$$

where $\psi_{1,2}^{(Q)}$ are two FC layers. The depth lifting model has the same structure as the quaternion model.

Therefore the variational lower bound in Eq. (5) can be written as the summation of each component:

$$\sum_{m\in\{Q,z\}} -KL(q_\phi(Z^{(m)}|f, m) \| p_\theta(Z^{(m)}|f)) + \mathbb{E}_{q_\phi(Z^{(m)}|f,m)}[\log p_\theta(m|f, Z^{(m)})] \quad (8)$$

Conditionally Dependent Components: The 3D components may be tightly dependent given the feature f, as exposed by the ill-posed 2D to 3D projection problem. To model such a dependent problem, a shared latent variable Z is used between all components, therefore the likelihood in Eq. (6) can be rewritten as:

$$\frac{(p_\theta(z|f, Z)p_\theta(Q|f, Z)p_\theta(Z|f)}{q_\phi(Z|f, z, Q)} \quad (9)$$

And the variational lower bound is:

$$-KL(q_\phi(Z|f, m) \| p_\theta(Z|f)) + \sum_{m\in\{Q,z\}} \mathbb{E}_{q_\phi(Z|f,m)}[\log p_\theta(m|f, Z)] \quad (10)$$

In practice, the expectation of the log-likelihood can be represented by taking the average of the 3D lifting loss over all proposals (e.g., a Monte Carlo (MC) estimation of the expectation). In aspects of the present disclosure, however, a best-of-many loss is used instead of the MC estimation to encourage diverse multimodal predictions. To be specific, the loss function is:

$$L_{3D} = KL + \min_{k=1,\ldots,K} \frac{1}{8}(\|B - \hat{B}_k\|_2) \quad (11)$$

where KL is a short for the KL-divergence term, the second term is the average alignment metrics on the eight (8) corners of the 3D bounding box. It should be noted that at each iteration, the best proposal is selected for optimization.

2.3 Lifting Confidence

The variational 3D lifting module 500 predicts K 3D bounding boxes 418 for each 2D proposal (e.g., fi 414), resulting in N*K 3D proposals in total. Afterward, a lifting confidence network (e.g., 420) is applied to compute the confidence score of each 3D proposal.

According to this aspect of the present disclosure, the confidence of the lifting $\hat{B}_{i,k}$ (e.g., 418) depends on three factors: 1) the feature f we lift 3D proposals from; 2) the 2D ROIs back-projected from 3D proposals vs. the original 2D proposals; 3) the social relation between 3D proposals. To tackle the three confidence factors, a confidence network is composed of three modules, for example, as presented in FIG. 6.

Figure 6:
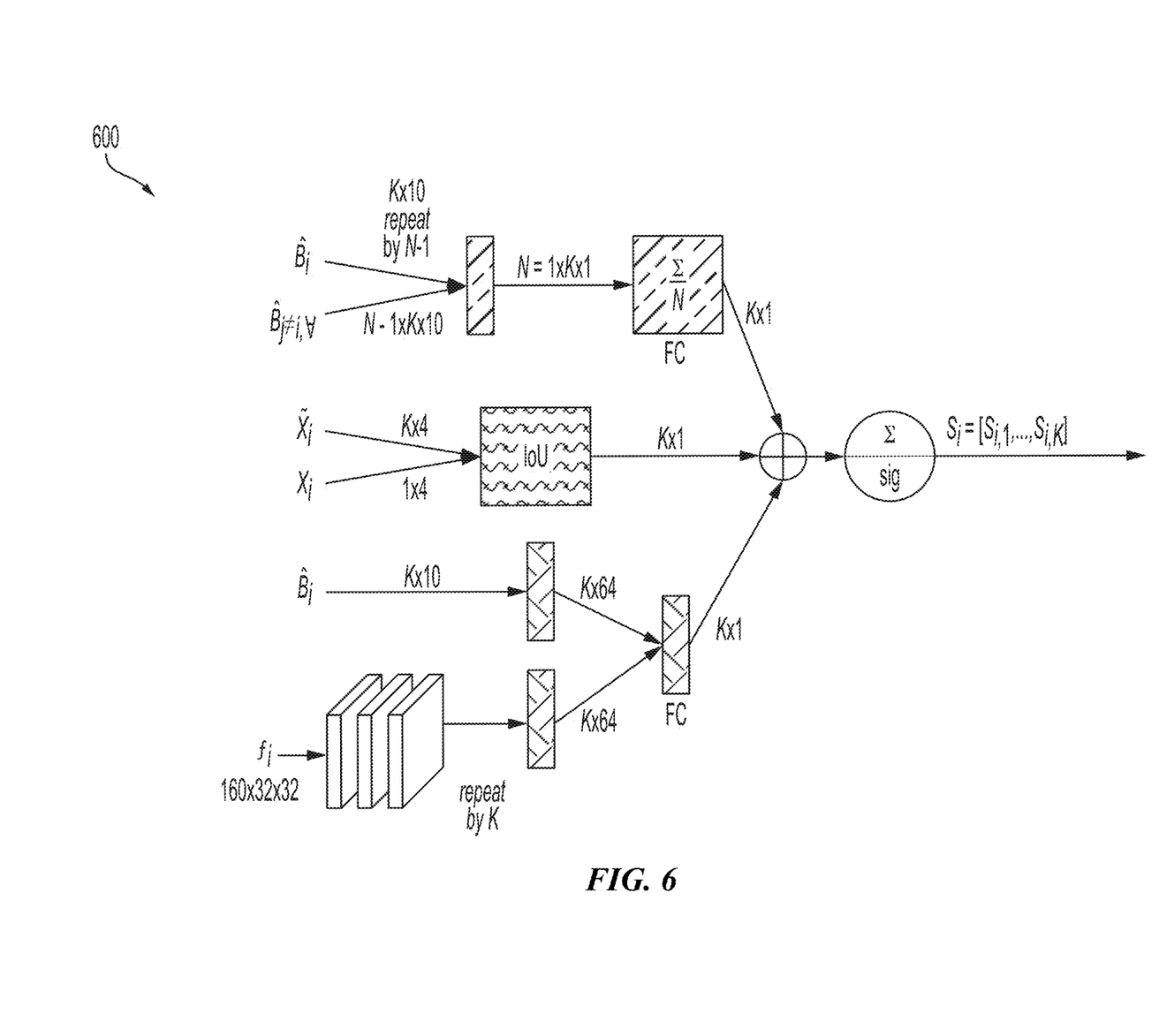
FIG. 6 illustrates training and testing of a confidence network 600, according to aspects of the present disclosure.

FIG. 6 illustrates training and testing of a confidence network 600, according to aspects of the present disclosure. In aspects of the present disclosure, the confidence network 600 may be configured according to the confidence network 420, as shown in FIG. 4. In this configuration, the confidence network 600 includes feature (feat) network (e.g., the feature confidence network 428), a projection (proj) network (e.g., the 3D-2D confidence network 426), and a social (soc) network (e.g., the social confidence network 422).

In one aspect of the present disclosure, a total confidence score is the summation of the network outputs which is normalized to [0,1] by a Sigmoid function:

$$\hat{s}_{i,j} = \text{Sigmoid}(\hat{s}_{i,j}^{soc} + \hat{s}_{i,j}^{feat} + \hat{s}_{i,j}^{proj}) \tag{12}$$

where $\hat{s}_{i,j}^{feat}$, $\hat{s}_{i,j}^{proj}$, and $\hat{s}_{i,j}^{soc}$ are the feature, projection and social confidence scores from each network.

The target of the confidence can be computed from differences between 3D lifting and actual 3D bounding boxes:

$$s_i = \text{softmax}(\text{LiftingLoss}(\hat{B}_{i,k}, B_i)) \tag{13}$$

Therefore the lifting confidence network can be regressed by the confidence loss:

$$L_{conf} = \frac{1}{N}\sum_{i=1}^{N} \text{CrossEntropy}(\hat{s}_i, s_i) \tag{14}$$

In this configuration, a Sigmoid function is used to predict the confidence score, as well as computing confidence score targets. This ensures that the confidence of one sample is independent to the other samples.

In addition, the confidence score target is computed by an exponential function:

$$s_i = e^{(-\text{LiftingLoss}(\hat{B}_{i,k}, B_i))}, \tag{15}$$

Therefore the total loss is:

$$L = \omega_1 L_{3D} + \omega_2 KLD + \omega_3 L_{conf} \tag{16}$$

2.4 Optimization Based Proposal Selection

Instead of using a 3D non-max suppression (NMS), aspects of the present disclosure are directed to a new proposal selection algorithm as a constrained optimization leveraging 3D collision-free constraint:

$$\max_{[k_1,\ldots,k_N]} \sum_{i=1}^{N} (\hat{s}_{i,ki}) \tag{17}$$

$$\text{subject to } IoU(\hat{B}_{i,k_i}, \hat{B}_{j,k_j}) = 0, \forall i,$$

where $[k_1, \ldots, k_N]$ are the indices of 3D proposals of N 2D proposals. It formulates an N dimensional integer programming problem.

Unfortunately, the above hard constraint is not always satisfied, especially when objects are close to each other in 3D world so that the variational lifting module cannot predict a collision-free 3D box given finite sampling times K. To ensure a solvable proposal selection problem, a multi-objective optimization problem is solved:

$$\max_{[k_1,\ldots,k_N]} \sum_{i=1}^{N} (\hat{s}_{i,k_i}) - \lambda \sum_{i=1}^{N}\sum_{j=1}^{n} IoU(\hat{B}_{i,k_i}, \hat{B}_{j,k_j}|i \neq j) \tag{18}$$

Where $\lambda>0$ is a hyperparameter. The algorithm selects one lifting from K samples of each object so that their total confidence is maximized while the total 3D lifting overlaps are minimized.

$$\max \sum_{i=1}^{N}\sum_{k=1}^{K} \hat{s}_{i,k} b_{i,k} \tag{19}$$

$$\text{subject to} \sum_{k=1}^{K} b_{i,k} \leq 1, \forall i \text{ and}$$

$$b_{i,k} + b_{m,n} \leq 1, \text{ if } IoU(B_{i,k}, B_{m,n}) \geq \epsilon$$

where $b_{i,k}$ is an indicator such that $b_{i,k}=1$ if the kth 3D proposal of the ith object is selected otherwise $b_{i,k}=0$, $\epsilon$ is an IoU threshold indicating the maximum 3D box overlaps allowed, e.g., $\epsilon=0.05$.

Eq. (18) formulates an integer programming problem of dimension N. For each 2D proposal, at-most one 3D proposal is selected, resulting in a search space of $O((K+1)^N)$. Such a space may be too large for a searching algorithm to find the optimal solution. Aspects of the present disclosure propose a soft 3D-NMS algorithm to tackle the curse of dimensionality.

This aspect of the present disclosure clusters the 2D proposals based on the 3D IoU between their proposals. To be specific, if one 3D proposal of a 2D proposal has IoU>0 with one 3D proposal of another 2D proposal, then these two 2D proposals are considered as the same cluster, so that their 2K 3D proposals are the same cluster. This results in m clusters for each image, with each cluster having $n_i$ 2D proposals, such that $\Sigma_{i=1}^{m} n_i = N$.

For each cluster, a search/optimization (e.g. BFS, A*, DP, or the like) is performed for the best solution to Eq. (18). The total complexity of the problem is still exponential and it depends on max(n); however, by performing clustering first, the value of max($n_i$) could be small enough so that the curse of dimensionality can be ignored. This aspect of the present disclosure beneficially addressing the ambiguity between a 2D projection and an actual 3D location and pose of an object in a video input received from a monocular camera by modeling ambiguity as an unknown stochastic latent variable using a probabilistic generative model (e.g., a conditional variational 3D detection (CV3D)).

Figure 7:
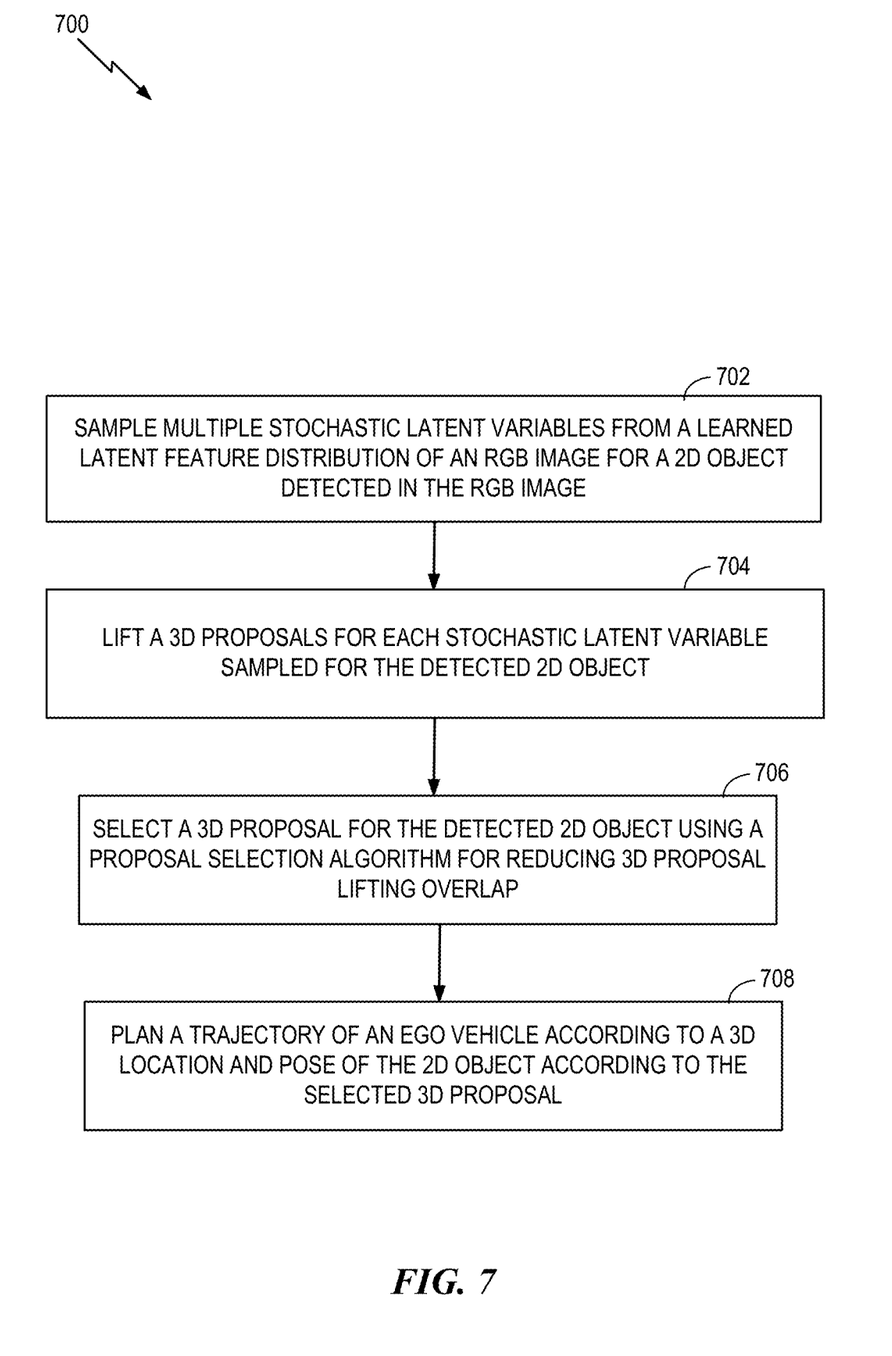
FIG. 7 is a flowchart illustrating a method for monocular 3D object detection, according to aspects of the present disclosure.

FIG. 7 is a flowchart illustrating a method for monocular 3D object detection, according to aspects of the present disclosure. The method 700 begins at block 702, in which multiple stochastic latent variables are sampled from a learned latent feature distribution of an RGB image for a 2D object detected in the RGB image. For example, as shown in FIG. 4, the variational 3D lifting block 410 samples K latent variables 415 (e.g., $Z_{i,1}, \ldots Z_{i,K}$) for a detected object i in response to a ground truth 3D 402 and an observed feature f of a detected object i (e.g., fi 414). At block 704, a 3D proposal is lifted for each stochastic latent variable sampled for the detected 2D object. For example, as shown in FIG. 4, the ROI lifting block 416 lifts one 3D box from each latent variable (e.g, $Z_{i,k}$) of the K latent variables 415 to form K 3D bounding boxes 418, which may be referred to as 3D bounding box proposals of the detected object i.

At block 706, a 3D proposal is selected for the detected 2D object using a proposal selection algorithm for reducing 3D proposal lifting overlap. For example, the confidence network 420 is applied to compute a confidence value for each of the K 3D bounding boxes 418. In addition, the lifting selection block 430 is configured to select the best 3D bounding box proposal as the final 3D bounding box output (e.g., a location and 3D pose of the detected object i), as shown in FIG. 4. At block 708, a trajectory of an ego vehicle is planned according to a 3D pose and a location of the 2D object according to the selected 3D proposal, for example, as performed by the planner module 330 and/or the controller module 340 shown in FIG. 3. Object perception using 3D monocular object detection from a single camera of the car 350 is beneficially improved according to aspects of the present disclosure.

In some aspects of the present disclosure, the method 700 may be performed by the SOC 100 (FIG. 1) or the software architecture 200 (FIG. 2) of the ego vehicle 150 (FIG. 1). That is, each of the elements of method 700 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for monocular 3D object perception, comprising:
   sampling multiple, stochastic latent variables from a learned latent feature distribution of an RGB image for a 2D object detected in the RGB image;
   lifting a 3D proposal for each stochastic latent variable sampled for the detected 2D object;
   selecting a 3D proposal for the detected 2D object using a proposal selection algorithm to reduce 3D proposal lifting overlap; and planning a trajectory of an ego vehicle according to a 3D location and pose of the 2D object according to the selected 3D proposal.

2. The method of claim 1, in which selecting the 3D proposal comprises:
estimating a confidence score for each lifted 3D proposal using a confidence network; and
presenting the 3D proposals with the highest confidence scores as the selected 3D proposal.

3. The method of claim 2, in which estimating the confidence score for each lifted 3D proposal is based on a respective visual feature, its 2D projection, and its relation to the other 3D proposals.

4. The method of claim 1, further comprising modeling ambiguity in 2D to 3D projection as uncertainty of a stochastic latent variable sampled from the learned latent distribution, resulting in one-to-many 3D predictions.

5. The method of claim 1, further comprising:
training a confidence network to estimate confidence scores of multiple 3D detected object proposals; and
selecting a monocular 3D object bounding box to prevent a physical overlap constraint.

6. The method of claim 1, further comprising:
training both a 2D detection module and a 3D detection module based on a 2D detection backbone.

7. The method of claim 1, in which selecting comprises constrained optimization leveraging of a 3D collision-free constraint.

8. The method of claim 1, in which each 3D proposal is represented as a 3D box bound to the detected 2D object.

9. The method of claim 1, in which sampling comprises generating the multiple stochastic latent variables using a deep convolutional neural network (CNN).

10. A non-transitory computer-readable medium having program code recorded thereon for monocular 3D object perception, the program code being executed by a processor and comprising:
program code to sample multiple, stochastic latent variables from a learned latent feature distribution of an RGB image for a 2D object detected in the RGB image;
program code to lift a 3D proposal for each stochastic latent variable sampled for the detected 2D object;
program code to select a 3D proposal for the detected 2D object using a proposal selection algorithm to reduce 3D proposal lifting overlap; and
program code to plan a trajectory of an ego vehicle according to a 3D location and pose of the 2D object according to the selected 3D proposal.

11. The non-transitory computer-readable medium of claim 10, in which the program code to select the 3D proposal comprises:
program code to estimate a confidence score for each lifted 3D proposal using a confidence network; and
program code to present the 3D proposal with the highest confidence score as the selected 3D proposal.

12. The non-transitory computer-readable medium of claim 11, in which the program code to estimate the confidence score for each lifted 3D proposal is based on a respective visual feature, its 2D projection, and its relation to the other 3D proposals.

13. The non-transitory computer-readable medium of claim 10, further comprising program code to model ambiguity in 2D to 3D projection as uncertainty of a stochastic latent variable sampled from the learned latent distribution, resulting in one-to-many 3D predictions.

14. The non-transitory computer-readable medium of claim 10, further comprising:
program code to train a confidence network to estimate confidence scores of multiple 3D detected object proposals; and
program code to select a monocular 3D object bounding box to prevent a physical overlap constraint.

15. The non-transitory computer-readable medium of claim 10, further comprising program code to train both a 2D detection module and a 3D detection module based on a 2D detection backbone.

16. The non-transitory computer-readable medium of claim 10, in which the program code to select comprises program code to constrain optimization leveraging of a 3D collision-free constraint.

17. The non-transitory computer-readable medium of claim 10, in which each 3D proposal is represented as a 3D box bound to the detected 2D object.

18. The non-transitory computer-readable medium of claim 10, in which the program code to sample comprises program code to generate the multiple stochastic latent variables using a deep convolutional neural network (CNN).

19. A system for variational 3D object detection, the system comprising:
a stochastic feature module configured to sample multiple, stochastic latent variables from a learned latent feature distribution of an RGB image for a 2D object detected in the RGB image;
a variational 3D lifting module configured to lift a 3D proposal for each stochastic latent variable sampled for the detected 2D object;
a 3D perception module configured to select a 3D proposal for the detected 2D object using a proposal selection algorithm to reduce 3D proposal lifting overlap; and
a planner module configured to plan a trajectory of an ego vehicle according to a 3D location and pose of the 2D object according to the selected 3D proposal.

20. The system of claim 19, further comprising confidence network module configured to estimate a confidence score for each lifted 3D proposal, and to present the 3D proposal with the highest confidence score as the selected 3D proposal.

* * * * *